United States Patent Office 3,437,313
Patented Apr. 8, 1969

3,437,313
GAS TURBINE BLADE COOLING
Alan Moore, London, England, assignor to Bristol Siddeley Engines Limited, London, England, a British company
Filed May 17, 1967, Ser. No. 639,226
Claims priority, application Great Britain, May 18, 1966, 22,055/66
Int. Cl. F01d 5/08, 5/18; F02g 1/00
U.S. Cl. 253—39.15                                    4 Claims

ABSTRACT OF THE DISCLOSURE

In a gas turbine the air delivered to a turbine rotor disc for delivery to cooling passages in the turbine blades, is at a higher pressure than the gas passing over and driving the turbine blades. A projection extends into the gas flow and uses some of the dynamic pressure head of the gas flow to resist the escape of cooling air into the gas flow.

---

This invention relates to gas turbines. It may be applied to the supply of compressed coolant gas, e.g., compressed air, for the cooling of gas turbines.

The present invention provides a gas turbine comprising a turbine rotor, structure upstream of the rotor, an annular gap between the rotor and the structure, and a restrictor at the gap arranged to utilise the dynamic pressure of the main gas flow through the turbine to control flow through the annular gap.

One aspect of the present invention provides a gas turbine comprising a turbine rotor, structure upstream of the rotor, an annular gap between opposing wall portions of the rotor and of the structure, wherein the rotor wall portion projects further into the main gas flow through the turbine than the opposing wall portion of the structure so that in operation the rotor wall portion causes a local obstruction of the main flow of gas which raises the gas pressure adjacent the gap to control flow through the gap and into the main gas flow.

The turbine rotor has blades which may be provided with internal coolant passages the inner ends of which communicate with inlets at the upstream face of the rotor, which inlets lie radially inward of the angular gap.

The gas turbine may be part of a gas turbine engine including a compressor and a combustor in which compressed air for cooling is ducted from a region between the compressor and the combustor to the coolant passages in the turbine blades.

Figure 1:
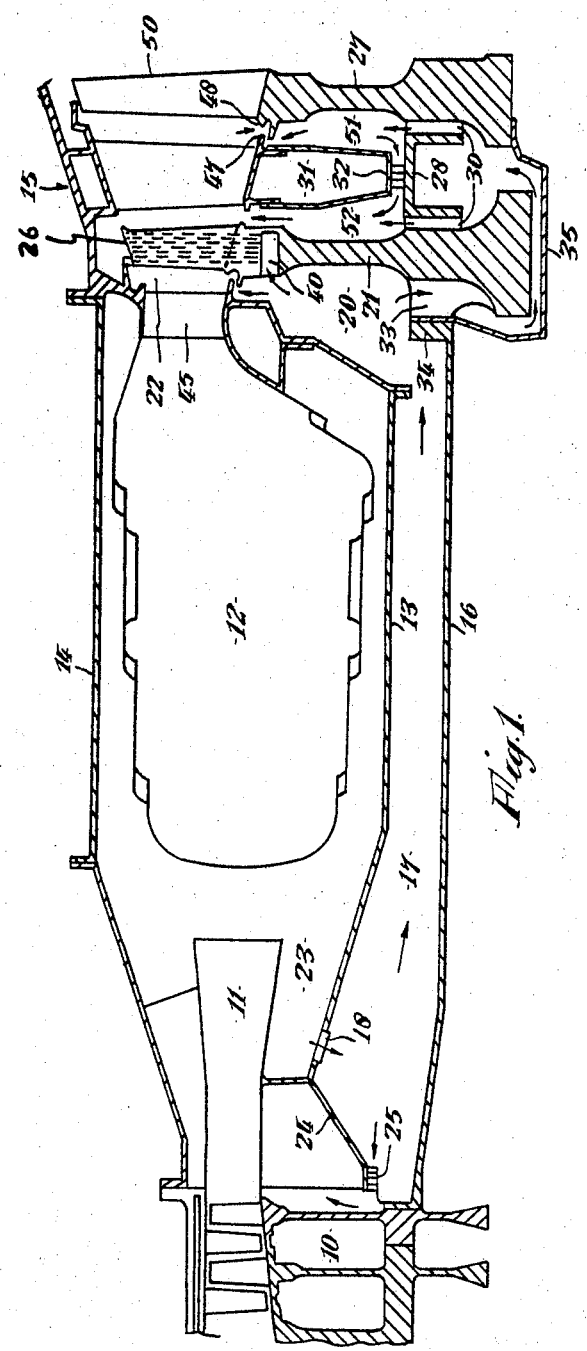
Figure 2:
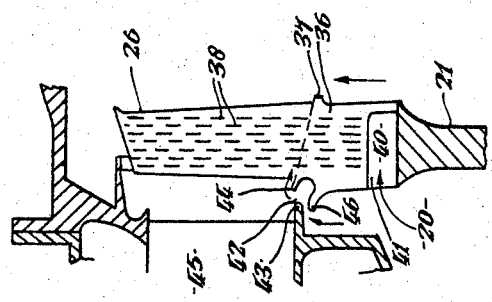
Figure 3:
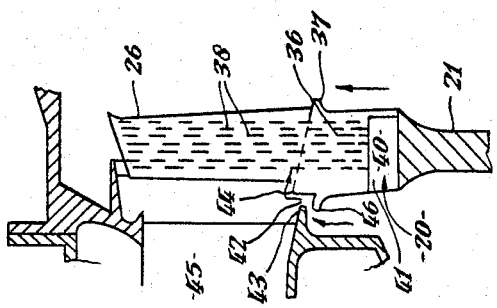

By way of example, the invention will now be described with reference to the accompanying diagrammatic drawings of which:

FIGURE 1 is a longitudinal section through part of an axial flow gas turbine engine from the delivery of the compressor system to a two-stage turbine, FIGURE 2 is, on a larger scale, a longitudinal section through part of the turbine shown in FIGURE 1, and FIGURE 3 is a similar section through a modified form of the arrangement shown in FIGURE 2.

Referring to FIGURE 1 the engine, which is a jet engine for propelling aircraft, comprises an axial flow compressor 10 which delivers compressed air through a so-called "dump" diffuser 11 to an annular combustor 12 having inner and outer air casings 13, 14, and a two-stage axial flow turbine 15 through which hot combustion gas from the combustor 12 is expanded causing the turbine to drive the compressor 10 through a shaft 16.

An axial passage 17 between the shaft 16 and the inner air casing 13 communicates at its upstream end with a circumferential series of bleed outlets 18 formed in the inner casing adjacent the diffuser 11 and at its downstream end with a radial passage 20 which lies between the downstream end portion of the inner casing 13 and an upstream turbine rotor disc 21. The radial passage 20 communicates at its outer end with a main annular flow passage 22 which conducts the hot combustion gases through the turbine. The outlets 18 communicate inside the combustor 12 directly with a zone of air 23 at the highest static pressure in the engine. An end flange 24 and seal 25 prevent or restrict recirculation of the high pressure air between the outlets 18 and the compressor delivery section.

The turbine 15 comprises the upstream rotor disc 21 which carries cooled blades 26, a downstream bladed rotor disc 27 which is connected by means of an annular flanged ring 28 and Hirth couplings 30 to the disc 21, and intervening stator structure 31 which at its inner end is sealed to the rotatable ring 28 by a sealing member 32. The disc 21 is reinforced with circumferentially-spaced bosses 33 through which it is bolted to a radial flange 34 on the adjacent end of the shaft 16. The same bolts support a hub shield 35, the downstream end of which seals against the inner end of the disc 27.

Referring to FIGURES 2 and 3, the blades 26, which include extended root portions 36 radially inwards of blade platforms 37, are formed with passages 38 for cooling air. The inner ends of the passages 38 communicate with a ring of separate axial cavities 40 of generally oval cross section in the disc 21, the open ends of which constitute inlets 41 in the upstream face of the disc.

The outer end of the radial passage 20 communicates with the main flow passage 22 of the turbine gas through an annular gap 42 defined between opposing lips 43, 44 on turbine nozzle entry vanes 45 and rotor blades 26 respectively, the lip 44 being constituted by the upstream edge portions of the blade platforms 37. In a conventional arrangement of the lips where the blade lip does not extend radially beyond the entry vane lip, any high pressure coolant air traversing passage 20 to the inlets 41 would suffer a pressure drop resulting in a pressure of coolant equal to approximately the low static pressure of the combustion gas flowing across the gap between the lips. The reduced coolant pressure could be insufficient for the required blade cooling, especially in the case of transpiration cooling.

Accordingly, the blades 26 are provided with platforms so arranged that the lip 44 projects from a location which is at a greater radius than the opposing lip 43. The lip 44 and the adjacent portion of the wall which supports it constitute an annular projection of concave form which projects radially into the main gas flow. As a result of the obstruction of the gas by the projection, a semi-stagnant zone is formed in front of the projection which has a pressure equal to the local static pressure of the gas plus at least an appreciable part of the dynamic pressure of the gas. Because of the resulting increased pressure at the gap between the lips, the coolant air traversing the radial passage 20 suffers a reduced pressure drop and is thus correspondingly more effective in cooling the blades.

The air pressure in the radial passage 20 is higher than the pressure of the gas flowing over the outer end of the passage, but if it is desired to hinder any possible local recirculation of gas into the passage, a baffle 46 is provided which is mounted on the blade root portions and extends across the radial passage towards the lip 43.

In FIGURE 3 the upstream lip 43 is inclined radially inwards to increase the effective radial projection into the gas flow of the opposing rotor wall portion 44 which is a plain flat wall.

Thus it will be seen that the blades 26 are cooled by air which is tapped from a zone 23 of high pressure and protected from too great a pressure drop during its passage to the cavities 40 and thence to the internal passages 38. Another advantage is that the arrangement avoids the requirement for a cover plate mounted from the disc 21 to guide the compressed coolant air to the inlets 41.

Only part of the high pressure air tapped through outlets 18 flows radially outwards along passage 20. Another part flows radially inwards between the bosses 33 and is deflected around the hub of the rotor disc 21 by shield 35 to reach the interdisc space. Here the flow of coolant air divides into two streams which pass outwards through clearances provided in the Hirth couplings 30 to flow along opposing faces of the stator structure 31 and finally escape into the main flow passage 22 of the turbine.

The escape of coolant air through the gap between the platforms 37 and the adjacent downstream stator structure 31 is unrestricted, but the escape of air through the gap between a lip 47 of the stator structure 31, and a lip 48 provided by the platforms of the second stage blades 50 is restricted in a manner similar to that described with reference to FIGURE 2, i.e., the downstream lip 48 is arranged to project into the gas flow and create a semistagnant zone of increased pressure.

Since the gas pressure at the upstream gap between the stator structure 31 and blade platform 37 is only a static pressure while the gas pressure at the downstream gap between the stator structure 31 and the projecting lip 48 of the blades 50 is a combined static and dynamic pressure of higher value, the air pressure in a radial passage 51 between the stator structure 31 and disc 27, will be higher than that in a radial passage 52 between disc 21 and structure 31, which is a reversal of normal practice. However, because of the fluid pressure control exerted by the lip 48 the difference in air pressure obtained in passages 51, 52 may be made smaller than that obtained in corresponding engines not provided with a projecting lip and so the pressure difference across, and leakage through, the sealing member 32 will be reduced, which in turn reduces the amount of cooling air required to be bled from the engine.

A further advantage which is obtained by the cooling system as illustrated, is that the upstream pressure on the rear face of the compressor 10 is resisted or balanced by the downstream pressure of the coolant air on the upstream face of the rotor disc 21 thereby reducing the resultant end thrust on the shaft end bearing (not shown).

Alternatively, and depending on the coolant pressure required, the coolant air may be bled from the delivery section or from a late stage of the compressor. If the coolant is bled from the delivery section, the end flange 24 and seal 25 would be omitted.

What I claim is:
1. In a gas turbine engine, a turbine rotor structure, a plurality of radially extending turbine blades secured to the rotor structure, stationary structure upstream of said turbine rotor structure, a plurality of radially extending nozzle blades secured to said stationary structure for directing a main gas stream along a path onto said turbine blades, said stationary structure defining with said turbine rotor structure a chamber for receiving coolant air, means for supplying coolant air to said chamber, means in the rotor structure for receiving coolant air from said chamber and for circulating said air within said turbine blades for providing cooling, said turbine rotor structure including an annular wall portion adjacent the radially inner ends of said turbine blades, said stationary structure including an annular wall portion adjacent the radially inner ends of said nozzle blades, said annular wall portions together defining a gap communicating said chamber with said main gas stream and through which in operation coolant air is permitted to bleed into the main flow, characterized in that said rotor wall portion extends to a greater diameter than said stationary wall portion and thereby projects into the path of said main gas stream so that in operation a part of the dynamic pressure of the main gas stream is utilized to resist flow of coolant air from said chamber through said gap.

2. In a gas turbine engine as claimed in claim 1, the annular wall portion of the turbine rotor structure includes an annular projection which extends towards said stationary wall portion at a position disposed inwardly of the largest diameter thereof and forms a baffle so as to hinder any local circulation of gas.

3. In a gas turbine engine as claimed in claim 1, the means for circulating coolant air within the turbine blades include internal coolant passages communicating with inlet openings in the upstream face of the turbine rotor, said inlet openings in turn communicating with said coolant air chamber.

4. In a gas turbine engine as claimed in claim 1, the turbine blades include surfaces formed of air permeable material which are in communication with the means for circulating air within said turbine blades so that in operation the surfaces discharge air into the main gas stream and are cooled thereby.

References Cited
UNITED STATES PATENTS

| | | | |
|---|---|---|---|
| 2,598,176 | 5/1952 | Johnstone | 253—39.15 |
| 2,656,147 | 10/1953 | Brownhill et al. | 253—39.15 |
| 2,741,455 | 4/1956 | Hunter | 253—39.15 XR |
| 3,043,561 | 7/1962 | Scheper | 253—39.15 |
| 3,240,468 | 3/1966 | Watts et al. | 253—39.15 |

JULIUS E. WEST, *Primary Examiner.*

U.S. Cl. X.R.
60—39.66